2,845,454

PREPARATION OF PHOSPHINIC ACID DERIVATIVES

Sheldon A. Buckler, Stamford, and Vernon P. Wystrach, Darien, Conn., assignors to American Cyanamid Company, New York, N. Y., a corporation of Maine No Drawing. Application June 27, 1957
Serial No. 668,289

11 Claims. (Cl. 260—500)

This invention is concerned with a novel method for preparing bis(1-alkyl-1-carboxy-1-hydroxymethyl)phosphinic acids and neutral alkaline salts thereof. More particularly, it relates to a process for producing bis(1-alkyl-1-carboxy-1-hydroxymethyl)phosphinic acid by oxidizing an α-ketoalkanoic acid-phosphine adduct, the latter being prepared in an acidic medium by reacting an α-ketoalkanoic acid and phosphine, and recovering the phosphinic acid derivative.

The process of the present invention results in the preparation of bis(1-alkyl-1-carboxy-1-hydroxymethyl)-phosphinic acids and neutral salts thereof which conform to the general formula:

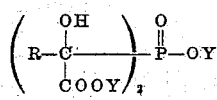

wherein Y is hydrogen, an alkali metal including lithium, sodium and potassium, or an alkaline earth metal such as calcium, barium and strontium, and R is an alkyl group of from 1 to 6 carbon atoms.

The compounds above defined have been found useful in a number of fields. For instance, in the treatment of alkaline soils containing insoluble iron values, iron chlorosis is prevented by the addition thereto of the defined acids and/or their salts, so as to form water-soluble complexes which are absorbable by the plant. Where an alkaline soil is deficient in iron values, the described acids (or neutral salts) can be reacted with ferric iron values and applied thereto to provide a water-soluble iron complex which can be readily utilized by the soil and plant. In addition, where paper is sized by means of rosin size and alum, ferric ion is selectively removed from the alum by forming a ferric ion complex of the phosphinic acids of the invention. Otherwise, the ferric ion causes discoloration of the finished product.

In general, the bis-(1-alkyl-1-carboxy-1-hydroxymethyl)phosphinic acid derivatives as above defined are prepared, according to the present invention, in a straightforward manner. An appropriate α-ketoalkanoic acid of from 3 to 7 carbon atoms and isomers thereof, may be reacted with phosphine in the presence of an acidic catalyst and an inert solvent. Usually, three moles of the α-keto acid and one mole of phosphine are required to obtain a water insoluble product which, upon infra-red examination, is determined to be a phosphine adduct conforming to the general structure:

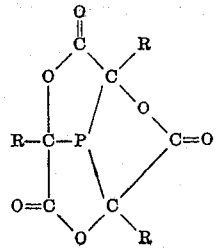

wherein R is an alkyl group of from 1 to 5 carbon atoms. The latter adduct is next oxidized so as to form the corresponding phosphinic acid. If desired, the acid may be neutralized with any suitable alkaline material to recover the salt either in solution or, upon evaporation, as a solid.

The preparation of the phosphine adduct may, for instance, be illustrated by reacting pyruvic acid (α-ketopropionic acid) with phosphine in the presence of an inert organic solvent and an acid catalyst. Although pyruvic acid is taken as exemplary, other α-keto (lower) alkanoic acids may be substituted therefor, as for example α-ketobutyric acid, α-ketopentanoic acid, α-ketohexanoic acid and α-ketoheptanoic acid.

Use of a wide variety of both inert organic solvents and acid catalysts in preparing the phosphine adduct are contemplated. Typically illustrative solvents are ether, dioxane, tetrahydrofuran and benzene. The acid catalysts contemplated include, for instance, boron trifluoride and strong mineral acids, such as hydrochloric, hydrobromic, phosphoric and sulfuric acids.

The reaction involving phosphine-adduct formation may take place at temperatures between 0° C. and about 25° C. A precipitate results. This precipitate is the phosphine adduct of the corresponding α-keto acid. Advantageously, the adduct may further be oxidized directly; alternatively, it can be initially separated from the mixture and subsequently oxidized, as desired.

It is an advantage of the present invention that the adduct may be oxidized directly by introducing any suitable oxidizing agent into the mixture. This agent may include, for instance, chromic oxide, alkaline or acid permanganate and nitric acid. Where nitric acid is used, concentrations in the range of from about 20% to about 70% are preferred. In general, the theoretical quantity of oxidizing agent, based on the adduct, is required to oxidize the phosphine adduct to the desired phosphinic acid. However, it is preferred to employ an excess of the theoretical quantity of oxidant to insure complete reaction.

It has been found that temperatures may vary over a wide range to effect oxidation, depending on the nature of the oxidant. Where, for instance, potassium permanganate is employed, a temperature range of from 0° C. to 30° C. is suitable. If nitric acid is selected, it is preferred to use a temperature between 55° C. and 110° C. In general, it is a good practice to utilize for purposes of oxidation an overall temperature range of from 0° C. to 110° C. The products so-produced are solids at room temperature and are soluble in water and lower alcohols, such as methanol and ethanol.

Oxidation can be completed within about 30 minutes to about 4 hours depending upon the temperature selected. Phosphinic acid derivative may be permitted to stand at room temperature for about 5 to 7 days to obtain a precipitate which can be filtered. However, the desired phosphinic acid derivative may be recovered swiftly by evaporation and, if desired, resultant acid derivative can be recrystallized from acetic acid. Moreover, when the reaction is complete, sufficient alkali may be added to the reaction mass to effect neutralization of the acid. Resultant neutral salt is obtained by evaporating the reaction mass. Typical alkaline neutralization agents include the alkali metal hydroxide, carbonates, bicarbonates and equivalents thereof, as for example, the hydroxides of sodium, potassium, lithium, and the carbonates or bicarbonates of the latter metals.

The following examples illustrate preferred embodiments of the invention and are presented merely as illustrative and not as limitative. Unless otherwise stated, the parts given are by weight.

EXAMPLE 1

*Preparation of pyruvic acid-phosphine adduct*

To a suitable reaction vessel containing 38 parts of pyruvic acid dissolved in 250 parts of ether there is added 6 parts of phosphine at a temperature of 15° C. over a period of about two hours. A pyruvic acid-phosphine adduct is readily formed as a precipitate. This adduct conforms to the structure:

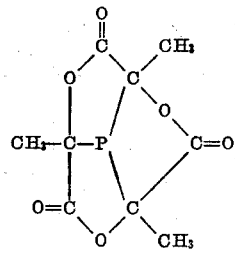

The compound is removed from the mixture by filtration and is identified by infra-red examination. It is a white solid, of melting point 272° C.–273° C.

EXAMPLE 2

The procedure of Example 1 is repeated in every respect with the exception that α-ketobutyric acid is substituted for pyruvic acid. A similar adduct is formed in which ethyl substituents rather than the methyl radicals of the previous example are present.

EXAMPLE 3

*Preparation of bis (1-methyl-1-carboxy-1-hydroxymethyl)phosphinic acid*

A mixture of 0.75 part of the adduct of Example 1 (pyruvic acid-phosphine adduct) and 4 parts of 33% nitric acid are directly refluxed without prior separation of the aforementioned adduct in a suitable reaction vessel for 35 minutes. The nitric acid oxidant is thereafter removed by distillation and the solid residue is recovered from the reaction vessel and recrystallized from acetic acid. 0.32 part of the corresponding phosphinic acid is recovered. This product, bis(1-methyl-1-carboxy-1-hydroxymethyl)phosphinic acid, has a melting point of 148° C.–149° C. and is readily soluble in water and alcohol forming a monohydrate upon exposure to moisture. Upon analysis of the product in the form of its monohydrate, which theoretically has a carbon content equal to 27.7%, a hydrogen content of 5.04 and a neutralization equivalent equal to 86.7, it was found that the carbon content corresponds to 27.71%, the hydrogen content corresponds to 5.02% and a neutralization equivalent corresponds to 87.0.

Similar results are obtained in the foregoing example by substituting 50% potassium permanganate in dilute sulfuric acid, employed as the oxidant in lieu of the nitric acid. Water is evaporated from the reaction mass under reduced pressure. The residue is next extracted with boiling acetic acid. On cooling, the corresponding phosphinic acid derivative is obtained as a solid.

EXAMPLE 4

*Preparation of tripotassium bis (1-methyl-1-carboxy-1-hydroxymethyl)phosphinate*

To a mixture of 0.66 part of 85% potassium hydroxide and 5 parts of the adduct of Example 1 in 25 parts of water, there is added slowly, and without cooling, 3.5 parts of powdered potassium permanganate. Upon completion of the oxidation, any unreacted permanganate is reduced with ethanol. The precipitate of hydrated manganese dioxide is removed by filtration. After evaporation of the water and acetic acid there remains 7.6 parts of a white, crystalline solid, which is substantially all the desired tripotassium salt. The neutral equivalent of the tripotassium salt is found to be 117; theory=118.6.

The corresponding sodium salt is prepared in a similar manner.

EXAMPLE 5

This example illustrates the formation of a ferric ion complex of bis(1-methyl-1-carboxy-1-hydroxymethyl)-phosphinic action in an alkaline solution.

In a suitable vessel, bis(1-methyl-1-carboxy-1-hydroxymethyl)phosphinic acid (0.25 part) is dissolved in water to make 100 parts of solution. The basicity of the solution is adjusted to pH 8 with sufficient sodium hydroxide. 20 parts of a ferric ammonium sulfate solution, containing 0.01 part of ferric ion per part of solution, is added. The solution is deep reddish-brown in color. Although the solution contains 3.6 moles of ferric ion per mole of complexing agent, precipitation of ferric hydroxide is not observed after several weeks standing.

We claim:

1. A process which comprises: reacting under anhydrous conditions an α-ketoalkanoic acid of from 3 to 7 carbon atoms with sufficient phosphine in the presence of an acid catalyst to form the corresponding phosphine adduct of the acid; oxidizing the thus-formed adduct, and recovering the resultant bis(1-alkyl-1-carboxy-1-hydroxymethyl)phosphinic acid from the mixture.

2. A process according to claim 1 in which the oxidation is carried out in the presence of nitric acid.

3. A process according to claim 1 in which the oxidation is carried out in the presence of potassium permanganate.

4. A process according to claim 1 in which the α-ketoalkanoic acid is pyruvic acid.

5. A process according to claim 1 in which the α-keto acid is α-ketobutyric acid.

6. A process according to claim 1 in which the acid is neutralized prior to recovery.

7. In a process for preparing a bis(1-alkyl-1-carboxy-1-hydroxymethyl)phosphinic acid, the steps which comprise: oxidizing a phosphine adduct of an α-ketoalkanoic acid and phosphine, and recovering the resultant phosphinic acid product.

8. In a process for preparing bis(1-methyl-1-carboxy-1-hydroxymethyl)phosphinic acid, the steps which comprise: oxidizing pyruvic acid-phosphine adduct, and recovering the resultant phosphinic acid product.

9. A process according to claim 8 in which the oxidation is carried out in the presence of nitric acid at a temperature of at least 55° C.

10. In a process for preparing bis(1-ethyl-1-carboxy-1-hydroxymethyl)phosphinic acid, the steps which comprise: reacting α-ketobutyric acid-phosphine adduct, and recovering the resultant phosphinic acid product.

11. A process according to claim 10 in which the oxidation is carried out in the presence of nitric acid at a temperature of at least 55° C.

No references cited.

UNITED STATES PATENT OFFICE
CERTIFICATE OF CORRECTION

July 29, 1958

Patent No. 2,845,454

Sheldon A. Buckler et al.

It is hereby certified that error appears in the printed specification of the above numbered patent requiring correction and that the said Letters Patent should read as corrected below.

Column 3, line 36, for "4 parts of 33%" read -- 4 parts of 35% --.

Signed and sealed this 5th day of May 1959.

(SEAL)
Attest:

KARL H. AXLINE
Attesting Officer

ROBERT C. WATSON
Commissioner of Patents